(12) United States Patent
Hermann et al.

(10) Patent No.: US 6,805,553 B2
(45) Date of Patent: Oct. 19, 2004

(54) CATALYTIC BURNER FOR A FUEL GAS GENERATING STACK SYSTEM

(75) Inventors: Ingo Hermann, Mainz (DE); Hans-Gerd Dusterwald, Mainz (DE)

(73) Assignee: General Motors Corporation, Detroit, MI (US)

( * ) Notice: Subject to any disclaimer, the term of this patent is extended or adjusted under 35 U.S.C. 154(b) by 717 days.

(21) Appl. No.: 09/778,030

(22) Filed: Feb. 6, 2001

(65) Prior Publication Data

US 2001/0022953 A1 Sep. 20, 2001

(30) Foreign Application Priority Data

Feb. 20, 2000 (DE) .......................................... 100 07 766

(51) Int. Cl.[7] .............................................. F23D 14/12
(52) U.S. Cl. ............................ 431/328; 431/7; 431/346
(58) Field of Search .......................... 431/328, 7, 346, 431/326; 422/211

(56) References Cited

U.S. PATENT DOCUMENTS

| | | | | |
|---|---|---|---|---|
| 4,203,963 A | * | 5/1980 | Scheffler et al. | 423/650 |
| 4,406,611 A | * | 9/1983 | Michel | 431/12 |
| 4,643,667 A | * | 2/1987 | Fleming | 431/7 |
| 5,297,620 A | * | 3/1994 | Yabe et al. | 165/104.12 |
| 6,179,608 B1 | * | 1/2001 | Kraemer et al. | 431/9 |

FOREIGN PATENT DOCUMENTS

| | | |
|---|---|---|
| DE | 3332572 | 10/1986 |
| DE | 3729114 | 3/1989 |
| DE | 4330130 | 10/1994 |
| DE | 19612430 | 10/1996 |
| DE | 69322622 | 5/1999 |
| EP | 0861802 | 9/1998 |
| JP | 57023716 | 2/1982 |
| JP | 59176509 | 10/1984 |
| JP | 60053711 | 3/1985 |
| JP | 61291820 | 12/1986 |
| JP | 1169222 | 7/1989 |
| JP | 6174212 | 6/1994 |

* cited by examiner

Primary Examiner—Alfred Basichas
(74) Attorney, Agent, or Firm—Cary W. Brooks

(57) ABSTRACT

A burner arrangement for the combustion of a fuel gas/ oxygen mixture, characterized by a body permeable for the mixture whose surface regions defining the free cross section of flow are covered with an oxidation catalyst, by a feeder device arranged on an intake side of the body permeable for the mixture which distributes the mixture over at least essentially the entire active intake area of the intake side and by a layer coordinated with the feeder device and separating the catalytic combustion zone of the permeable body from the mixture inflow, but permeable for it, which serves as a flashback safety.

19 Claims, 6 Drawing Sheets

CATALYTIC BURNER FOR A FUEL GAS GENERATING STACK SYSTEM

TECHNICAL FIELD

The present invention concerns a burner arrangement for the combustion of a fuel gas/oxygen mixture, especially for use for the preparation of fuel gas in a fuel cell system.

BACKGROUND OF THE INVENTION

Fuel cell systems require hydrogen as the energy source. This hydrogen is frequently produced by an endothermic conversion process from liquid energy carriers with a high H/C ratio. The necessary process heat is supplied by exothermic reactions which are implemented via autothermic or allothermic process modes. The combination of heat generation and hydrogen production units forms the fuel gas preparation system (a.k.a. "fuel processor") for the actual fuel cells, which are frequently arranged spatially separated from the fuel gas preparation system.

In the autothermic reaction mode, the heat is generated and consumed directly inside a reaction zone, i.e. at least one exothermic and one endothermic reaction are linked together. However, this leads to poor quality of the product stream.

In the allothermic process mode the heat source, i.e., the fuel arrangement and the heat sink, e.g. the reformer unit, are geometrically separated, but may be arranged directly side by side. This means that the reformer unit is supplied from the outside with heat, said heat being implemented by a combination of convection, conduction and radiation. In other words, the exothermic reaction in the burner arrangement and the endothermic reaction in the reformer unit are locally separated from each other.

Predominantly, catalytic burners are used in the allothernic reactor design for fuel cell systems. During catalytic combustion, the gaseous fuel gases react with oxygen (usually supplied in the form of air) on the surface of a fixed catalyst. Typical catalysts are the noble metals, platinum and palladium. The quantity of energy required for starting the reaction—the activation energy—is reduced by the catalyst. As a result, the conduction temperatures are clearly reduced and the thermal $NO_x$, formation is avoided. An almost complete reduction of the educts is assured by the catalyst. In addition, the catalytic burners operate with very little pollution.

Because of the above mentioned advantages, catalytic burners are generally used for fuel preparation systems. However, a number of disadvantages exist such as:

it is difficult to make the heat coupling efficient; it is usually accomplished by conduction and convection via a carried medium, energy losses arise due to the spatial separation from the heat sink, the arrangement tends to favor a large structural volume and has a corresponding high weight, lag times arise in the operating magnitudes in the case of dynamic load variation.

SUMMARY OF THE INVENTION

The object of the present invention is to devise a burner arrangement which leads to an efficient coupling of heat, avoids energy losses due to the spatial separation of the heat sink which has a relatively small weight and can therefore be operated in such a way that the heat generation can be better adapted to the dynamic load variation conditions with relatively short lag times.

To solve this problem, the present invention envisions a burner arrangement for the combustion of a fuel gas/oxygen or air mixture characterized by a body which is permeable for the mixture whose surface areas defining the free cross section of flow are covered with an oxidation catalyst, by a feeder device for the mixture arranged on an inlet side of the permeable body which distributes the mixture over at least essentially the entire inlet area of the inlet side and by a layer coordinated with the feeder device separating the catalytic combustion zone of the permeable body from the inflow of mixture, but permeable for it, which serves as a flashback safety.

The permeable body is preferably rectangular when viewed from the top, especially square, and can therefore be inserted in a sandwich-like structure with alternating zones of heat generation and heat consumption, despite the fact that the permeable body has flow passing through it perpendicular to its flat area and not along its flat area as is the case, for example, in the fuel preparing system known from EP-A 0 861 802.

In this fuel preparation system, the zones for catalytic combustion, reforming, evaporation, superheating, etc. alternate with each other, in which case a strongly endothermic reaction stage such as reforming must necessarily be surrounded on both sides by heat-supplying combustion stages. The catalytic combustion conventionally takes place there on pellets, which are spatially fixed in a flat zone, in which case the mixture flows along the flat zone. The above mentioned problems are also true here. It has been found that arrangements with catalytic pellets are disadvantageous for various reasons.

The burner arrangement according to the present invention also necessitates a certain structural height, but has the fundamental advantage that when the burner arrangement is put into operation and possibly when it is in operation, not only is catalytic combustion, but normal combustion is also possible, on or directly above the outlet side of the permeable body. As a result, the generated heat, on the one hand, causes a rapid heating up of the permeable body coated with catalyst without the need of charging the burner arrangement with preheated gases. On the other hand, heat is efficiently transferred to the neighboring endothermic stage or stages both during operational startup of the burner arrangement with the aid of normal combustion and also in the case of catalytic combustion in the permeable body after startup. The heat is balanced out primarily by radiation to the opposite surfaces in each case. This is highly efficient, because according to the Stefen-Boltzmann law, the temperatures enter in with the fourth power. Convection and conduction also take place. Their involvement in the heat transfer, however, is clearly smaller.

In steady state operation of the fuel preparation system it is easily and simply controlled, because the surface temperature of the burner arrangement can be adjusted precisely via the enthalpy stream of the incoming fuel gas. The heat flux into the reforming zone or reforming zones can be governed by radiant heat exchange. Since the burner operates almost completely catalytically, the pollutant emissions are very low.

The energy from the hot burner exhaust gases can be cycled back into the process economically via a heat recovery device, such as a heat exchanger, and is therefore not lost.

In the case of dynamic operation o the fuel preparation system, e.g., in the case of mobile use in a car, very strict load change requirements exist with respect to the hydrogen demand in the burner arrangement. The fuel preparation system must always be capable of covering this hydrogen demand. The time constants for variations of the hydrogen flow lie in the millisecond range so that different requirements on the catalytic burner arrangement result. In other words, it must be capable of realizing fast load cycles for the streams of educt material, of achieving complete reaction of the educts within this time constant and assure an efficient and sufficiently fast heat transfer. The management of the material flows, i.e. the sluicing in and out and the regulating of the material flows presents no system-engineering obstacle. The modulation of a purely catalytic operating burner, conversely, cannot be realized within the above known time constants. The complete reaction of varying streams of educt lies in the second range. A conventional purely catalytic burner reacts too slowly in the case of load change jumps. Complete combustion cannot take place. However, it is possible by using the invention, via the also reliable homogeneous flame combustion, to design the burner arrangement in such a way that it can satisfy these critical dynamic requirements. The flame combustion can be initiated by electrical ignition. When the ignition is active, rapidly varying fuel gas streams are transformed into a flame. The emissions during this heterogeneously supported combustion are higher than in a case of purely catalytic operation, but nevertheless can be kept within reasonable limits.

In other words, the activation of the ignition is adapted to the load cycle in each case. A well-thought-through regulation principle is necessary for this in order to assure that the necessary heat balance is maintained for the endothermic zones. This means the regulation of the material flows of fuel gas and air, the distribution of the material flows over the catalytic surface, the maintenance of a corresponding surface temperature and the switching on of the ignition when required. The catalytic converter can be dimensioned in such a way that the heterogeneously supported operation with flame combustion is automatically adjusted during dynamic operation, while in the case of steady state operation the purely catalytic operating mode takes place. The balancing out of the heat by radiation, as already stated above, is fast and efficient. It is considered to be a major advantage that the burner arrangement according to the invention is capable of satisfying the dynamic conditions during mobile use within a compact fuel preparation system.

The burner arrangement according to the invention is therefore suitable as a decentralized heat source inside a compact fuel preparation system also for mobile use and offers, taken together, the following advantages:

small volume and low weight, minimized heat loses due to the sequential arrangement of heat sources and heat sinks, efficient and rapid coupling in of heat by radiation, possibility of fast load change cycles, minimization of the emission of pollutants by catalytic combustion;

selective management of heat and material balances.

BRIEF DESCRIPTION OF THE DRAWINGS

Especially preferred variants of the invention may be perceived from the claims and are described in more detail below with reference to the appended drawings, in which:

DESCRIPTION OF THE PREFERRED EMBODIMENT

Figure 1:
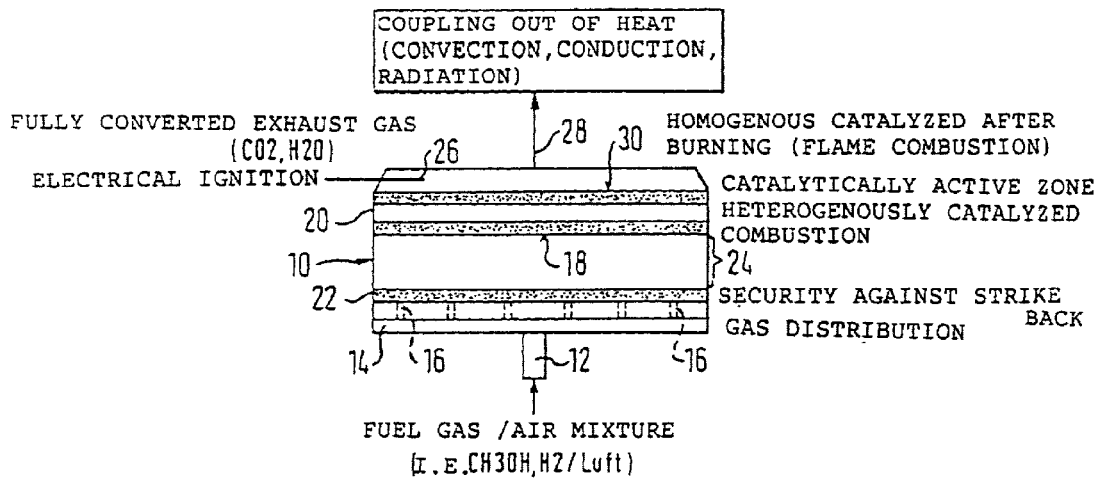
FIG. 1 shows a schematic representation of the principle of a burner arrangement according to the invention.

The basic unit of a catalytic burner arrangement 10 according to the invention has the schematic structure shown in FIG. 1. The preheated fuel gas/oxygen mixture, here in the form of a fuel gas/air mixture, enters through a feeder connecting pipe 12 into a feeder arrangement 14 in the burner arrangement 10. Although the feeder connecting pipe 12 in FIG. 1 is shown below, the burner arrangement 10 and may also actually be arranged below the burner arrangement 10, it is preferably inserted in the side in the feeder device 14 as will be explained in more detail below.

Inside the feeder device 14, cross members 16 are positioned, in this example, which assure that the inflowing mixture is distributed over the entire active intake area of the intake side 18 of the permeable body 20. The permeable body 20 in this example consists of a permeable monolithic body of ceramic, e.g., in the form which is known for exhaust gas purification catalysts, the surface areas of the ceramic body which define its free cross section of flow being covered with a suitable oxidation catalyst, e.g., platinum or palladium. The permeable body 20 could alternatively consist of metal as explained below.

A permeable layer 22 also belongs to the feeder device 14 which serves as a flashback safety and prevents the combustion flames, which are formed in the case of flame combustion, from striking backward into the feeder device 14 and causing combustion of the mixture present there. The flashback safety 22 may in principle consist of any temperature-resistant layer with pores or openings which are small enough to prevent the propagation of the flames into the device. The layer preferably consists of a perforated sheet metal part which will be explained in detail later in connection with FIG. 4 in the following figures.

Between the permeable layers forming the flashback safety and the intake area 18 of the permeable catalyst-covered body, i.e. the catalyst support, is a spacer 24 which also assures the uniform distribution of the fuel gas mixture over the intake area 18 so that all areas of the permeable body may participate in the catalytic combustion.

The permeable layer 22 which separates the downstream reaction zone, i.e. the catalyst body 20, from the mixture inflow zone serves not only as a flash-back safety, which is especially important in the case of hydrogen firing of the burner arrangement, but also as a temperature barrier. The permeable body 20 which here is designed as a ceramic monolith need not necessarily be made from ceramic. Catalystcoated metal structures could also come into consideration here, especially metal nets which could consist, for example, of a wire braid, e.g., similar to a metal scouring pad, or a metal foam. Monoliths and metal nets of various geometries are conceivable. The important point is that the thickness of the catalytically active zone be designed according to the envisioned quantity of fuel gas so as to enable its complete catalytic reaction.

Behind the catalytic reactive zone is an electrical ignition 26 which may also be or arbitrary design, e.g., a spark gap, a piezoelectric igniter or a resistor wire. During the startup operation of the burner, the ignition of the mixture is accomplished by using the electrical ignition. A normal flame combustion begins on the top side 30 of the permeable body 20. This homogeneous combustion assures high temperatures so that, on the one hand, heat is emitted in a direction of the arrow 28 from this flame combustion, and on the other hand, the catalytic reaction zone, i.e., the permeable body 20, is suitable heated up. Above a temperature level of 300° C. then, the heterogeneously catalyzed reaction of the catalyst takes place, i.e. on the catalyst-covered surface areas of the permeable body 20. Depending on the fuel gas used, the temperature of this catalytically active zone is stabilized at a level between 400 and 800° C. An almost complete reaction by heterogeneous catalysis takes place. No homogeneous afterburning occurs, and the electrical ignition is not active. The pollutant emissions in this steady operating phase are extremely low. The heat is balanced out primarily by radiation corresponding to the direction of the arrow 28 toward a device lying opposite the outlet side 30 of the permeable body 20, e.g. an endothermic stage of a fuel preparation system. This is highly efficient, because according to the Stefan-Boltzmann law, temperatures enter in with the fourth power. Convection and conduction also take place, but their degree of involvement in heat transfer is much lower.

In this steady-state operating mode, the fuel preparation system is simple to control, because the surface temperatures of the burner arrangement, here functioning as radiation burners, can be precisely adjusted via the enthalpy stream of the incoming fuel gas.

The exhaust gases of catalytic combustion consist of totally reacted burner exhaust gas, predominantly $CO_2$ and $H_2O$. The exergy of these hot burner exhaust gases may for example, be utilized via a side exhaust gas duct by means of a heat exchanger in the processes taking place in the fuel preparation system.

If one assumes that the burner arrangement 10 is installed in the fuel cell drive system of a car or truck and that the vehicle is being driven in the partial load range, then during this partial load operation, only as much heat is generated in the burner arrangement 10 as is necessary, for example, to conduct the reforming work in a connected reforming unit so that the unit makes sufficient quantities of a hydrogen-rich synthetic gas available for the fuel cells. If more power is required immediately, for example, in order to carry out an overtaking maneuver, then because of the inertia of catalytic combustion, at times it would be impossible to increase the heat emission from the catalytic burner arrangement 10 in such a way that the reforming work could also make increased quantities of hydrogen-rich synthetic gas available immediately. In order to remedy this, the electrical ignition 26 can be switched on one more so that the supply of extra fuel can be increased abruptly, reacted partially catalytically and partially via a homogeneous flame combustion, and transformed into heat on or just above the outlet side 30 of the permeable body 20 so that the necessary increased quantity of heat for the reforming work can be made available in a short time. In other words, the region above the outlet side 130 of the permeable body 120 is designed as a combustion chamber.

The burner arrangement 10 according to FIG. 1 can easily be modified in the sense that the feeder device 14 now feeds the fuel mixture to two permeable bodies 20, i.e., the mixture is fed upwardly on the one hand as shown in FIG. 1 and downwardly on the other. For this, it is necessary to provide below the connecting pipe 12 arranged on the side a second porous layer and at a distance below this second porous layer another permeable catalyst-covered body (not shown in FIG. 1). The burner arrangement thus achieved will then emit not only heat corresponding to the arrow 28 upward, but also will emit heat in the opposite direction downward from the other permeable body 20.

Figure 2:
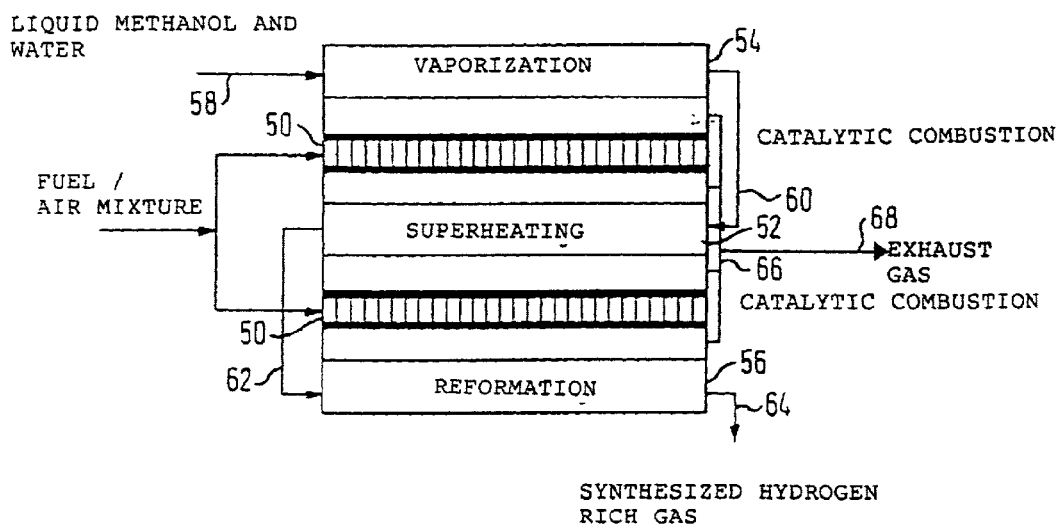
FIG. 2 is a schematic drawing to illustrate how the burner arrangement according to the invention can be integrated into a fuel preparation system.

How such a two-sided emitting burner arrangement can be utilized can be seen from the schematic drawing in FIG. 2.

Figure 3:
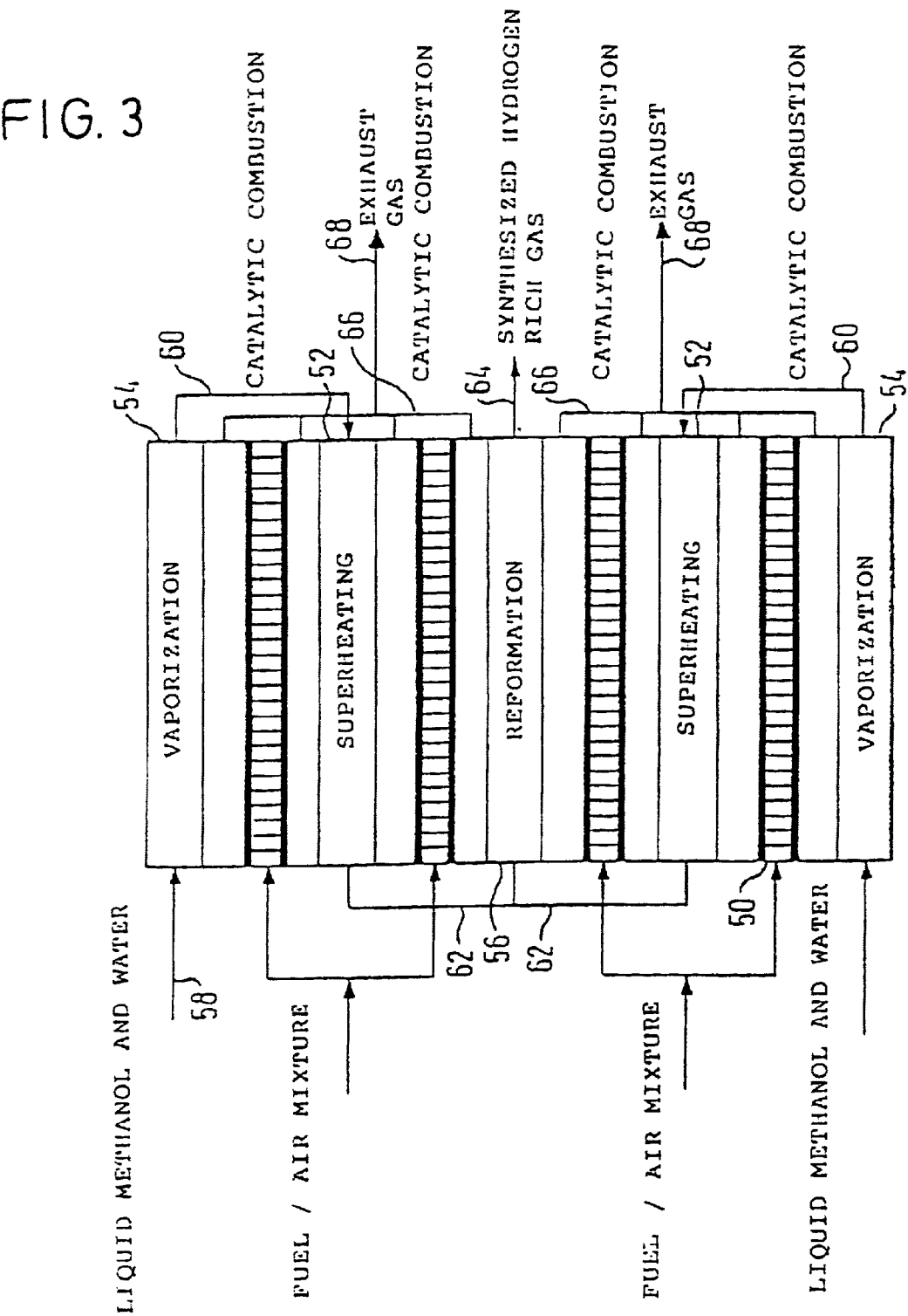
FIG. 3 is another modification of the arrangement in FIG. 2 in order to give an example of how a layer-like structure of a fuel preparation system is possible in principle.

In this drawing, the reference symbol 50 refers to such a dual arrangement, i.e., the above described dual arrangement of the basic arrangement of FIG. 1. In FIG. 2, two such dual arrangements 50 are provided. Between them, a superheating zone 52 of a fuel preparation system is arranged so that this superheating zone 52 receives radiant heat from both sides from the two burner arrangements 50. Above the upper burner arrangement 50 in addition, an evaporation zone 54 is positioned which is supplied as shown in FIG. 2 only on one side with radiant heat from the upper burner arrangement 50 according to the invention. Below the lower burner arrangement 50 is a reforming zone 56 for the fuel preparation system which is supplied with radiant heat only from above from the lower burner arrangement 50 according to the invention. In practice, the reforming zone 46 requires a strong supply of heat so that the arrangement shown in FIG. 2 in a practical example will sometimes be doubled, as FIG. 3 shows.

The specific design of the fuel preparation system is not a part of the present invention. The design of the fuel preparation system, however, is well known in practice, as described for example in the above-cited EP-A 0 861 802.

It is important here only to express the fact that the reforming zone 56 has the task of generating a hydrogen-rich synthetic gas. In the example shown in FIG. 2, methanol and water are transformed into this hydrogen-rich synthetic gas in the reforming unit. For this purpose, initially liquid methanol and water flow according to the arrow 58 into the evaporation zone 54. Here they are vaporized and then in the form of a gas, flow according to arrow ;60 into the superheating zone. Here the temperature of the gases is further increased. They are finally fed according to arrow 62 to the reforming zone 56 from which the desired hydrogen-rich synthetic gas is then fed directly to the fuel cells, the so-called stack, in order to generate electrical energy there for driving a vehicle or for other purposes.

The hot exhaust gases from the burner arrangements 50 according to the invention are brought together via a system of channels 66 and carried off in the direction of arrow 68. Since these exhaust gases contain considerable quantities of thermal energy, they are usually fed to a heat exchanger so that the heat contained there can be recovered and re-utilized for the remaining processes being conducted.

FIG. 3 shows basically the same think as FIG. 2, but with the difference that now four burner arrangements 50, according to the invention, are provided and the reforming zone 56 now receives heat from above and below.

The reference numbers used in FIG. 2 are also used in FIG. 3 and the descriptions of the correspondingly designated elements are also valid for the arrangement shown in FIG. 3. Here one sees that the evaporation zone 54 and the superheating zone 52 occur twice. In a practical fuel preparation system, the individual elements may be present repeatedly and the invention here makes modular construction possible. In a practical fuel preparation system, other refining stages will be used which may also be integrated into the structure shown here.

A specific design of a burner arrangement according to the invention, corresponding to FIG. 1, will now be explained with references to FIGS. 4 thru 12.

Here the same reference numbers are used as in the example of embodiment tin FIG. 1, but increased by the base number 100. The descriptions given for the parts in FIG. 1 with corresponding reference numbers are also applicable here unless otherwise stated.

Figure 4:
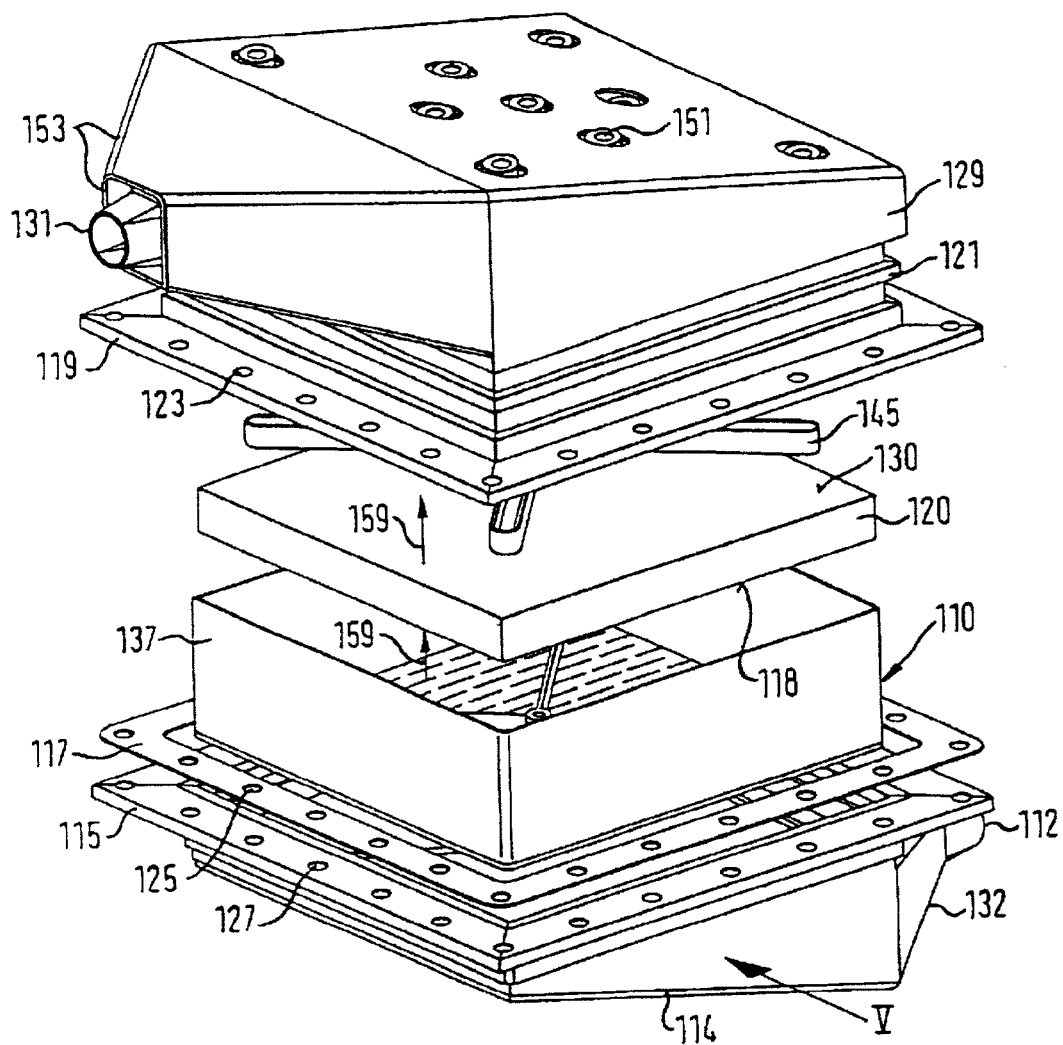
FIG. 4 is a representation of a first practical variant of a burner arrangement according to the invention in an exploded perspective view.

The burner arrangement 110 according to the invention in FIG. 4 consists of a feeder device 114 with a side gas feed connecting pipe 112 and is shown in the assembled state screwed together with a flange 115 and gasket 117, with a flange 119 of a housing 121, by screws which extend through the corresponding borings, such as 123, 125 and 127. The housing part 121 is firmly connected to an exhaust gas line 129 which opens into a side connection 131 for an exhaust gas pipe.

Figure 5:
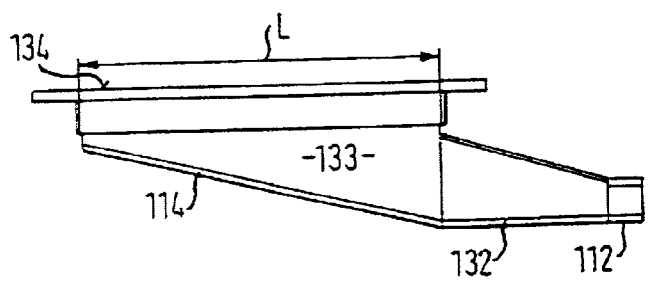
FIG. 5 shows the feeder device of the burner arrangement according to the invention in FIG. 4 viewed in the direction of the arrow V in FIG. 4.
Figure 6:
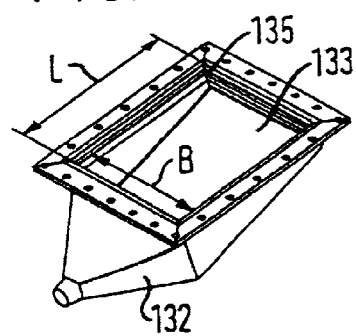
FIG. 6 is a perspective representation of the feeder device in FIG. 5 on a smaller scale.

One will note, especially from FIGS. 5 and 6, that the feed connecting pipe 112 is connected by an intermediate piece 131 to a wedge-shaped feeder space 133 in such a way that the fuel gas/oxygen mixture which is introduced through the connecting pipe 112 into the feeder device 114 is distributed over the full width, B in FIG. 6, of the feeder space 133. Due to the wedge-shaped configuration of the feeder space 133 as shown in FIG. 5, the inflowing gases are deflected upward in FIG. 5 and distributed uniformly over the length L and width B of the opening 133 at the end face of the feeder device 114. A porous filter which also serves as an additional flashback safety may be installed in the feeder device 114, e.g., at the transition between the intermediate piece 131 and the feeder space 133.

One also notes from FIG. 6 that the upper end face of the air supply unit 114 has a circulation stage 135. This stage occupies the bottom side of the part 137 which can be recognized more simply in FIGS. 7 and 8 and consists of a perforated metal sheet which forms the flashback safety 122. The perforated sheet metal 122 forming the flashback safety has slotted openings 139 which are arranged in rows at regular intervals, each row being offset with respect to the neighboring row by half a division. The slots are dimensioned such that a flame forming in the space 124 of the perforated metal sheet cannot ignite the mixture located in the space 133 below the perforated sheet.

The wall region 141 of part 137 in the assembled state now fits into the housing 121.

Figure 8:
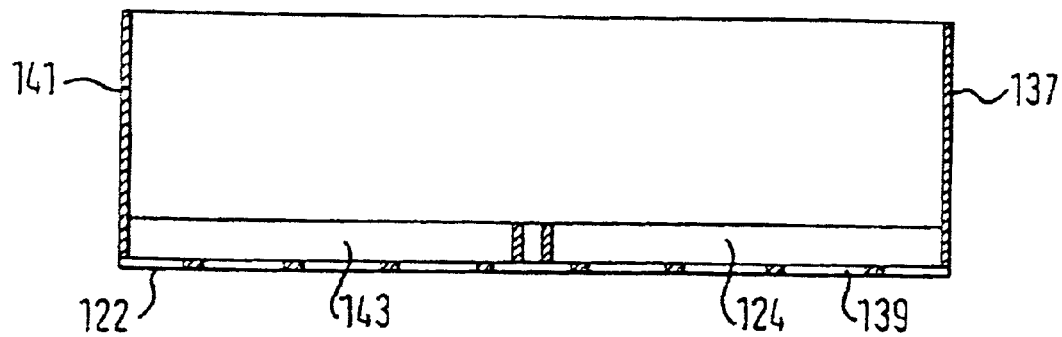
FIG. 8 is a cross section through the flashback safety in FIG. 7 according to the invention along section line VIII—VIII in FIG. 7.
Figure 7:
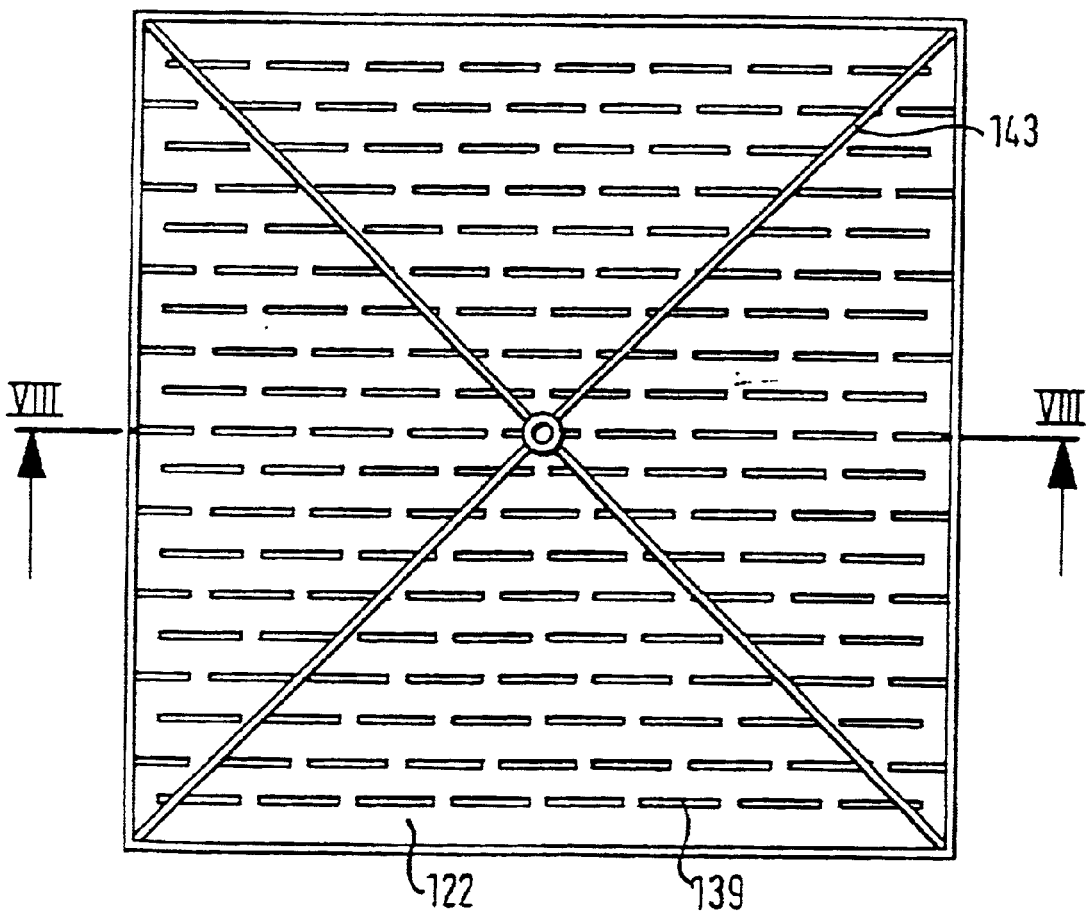
FIG. 7 is a top view of a flashback safety of the burner arrangement in FIG. 4 according to the invention.
Figure 10:
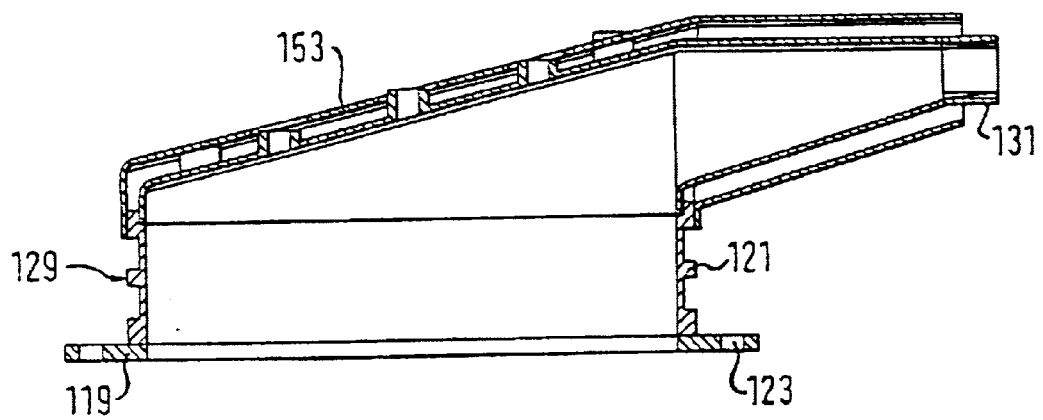
FIG. 10 is a cross section through the exhaust gas duct in FIG. 9 corresponding to section plane X—X in FIG. 9.
Figure 9:
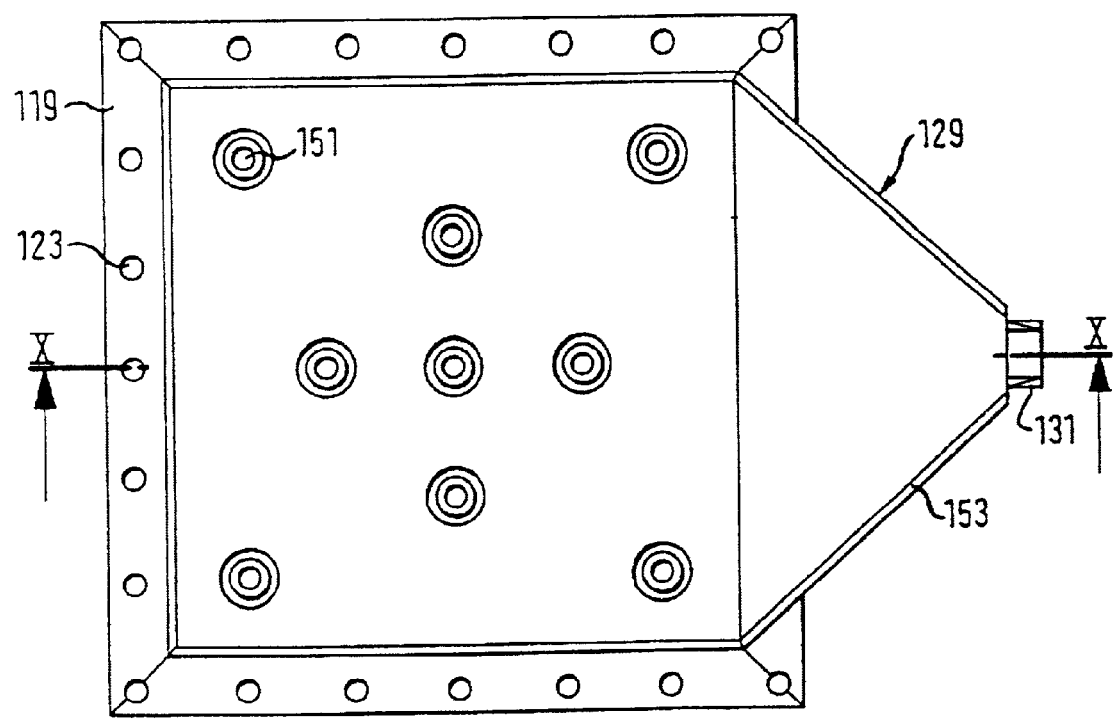
FIG. 9 is a top view of the exhaust gas duct of the burner arrangement according to the invention shown in FIG. 4.

From FIG. 4 and above all from FIGS. 7 and 8, a spacer 143 is visible which displays four arms arranged crossing each other and assures that the permeable body 120 is held at a distance above the perforated sheet 122 so that the mixture flowing through the slots into the corresponding space 124 can be uniformly distributed over the intake area 118 of the permeable catalyst-coated body 120.

Above the permeable body 120, as FIG. 4 shows, is another cross 145 which is held captive inside the housing 121 and assures that the permeable body 120 is firmly held between itself and the spacer 143. The electrical ignition is not shown here for simplicity. The hot exhaust gases from catalytic combustion in or on the permeable body 120 can flow unimpeded past the cross 145 and are guided by the also wedge-shaped exhaust gas conduit 129 to the connection 131.

Figure 11:
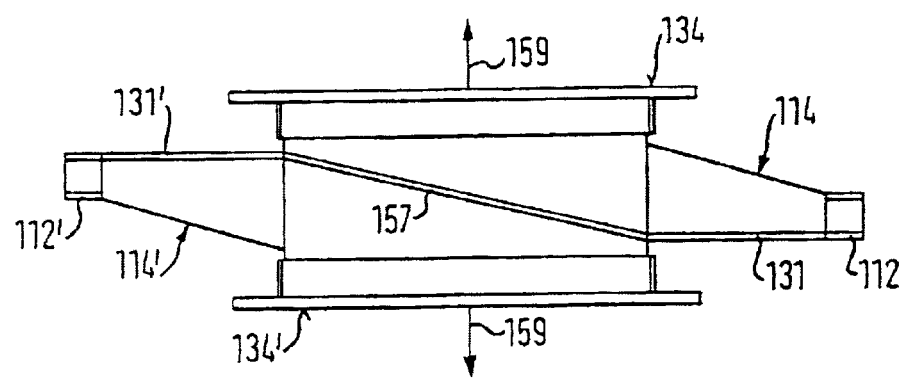
FIG. 11 is a representation of a space-saving application of two feeder devices according to FIG. 5 for feeding two burner arrangements according to the invention.

The parts denoted by 151 here represent only openings for measuring instruments which would not be present in a practical example. The exhaust gas conduit 129 in FIG. 4 is designed with double walls. The outer wall, for example, is recognized at 153 (see also FIG. 4) in order to prevent the hot exhaust gases from causing combustion. The wedge shape of the feeder device 114 has not only the advantage that it promotes distribution of the inflowing gas mixture over the entire intake area 118 of the permeable body 120 but also, as FIG. 11 shows, that two feeder devices 114, 114' can be arranged opposite each other so that the corresponding end faces 133 and 133' run parallel to each other without making the overall construction height of the two feeder devices 114, 114' excessively great. From this, one sees that a dual burner arrangement can be achieved, if a second burner arrangement as shown in FIG. 4 is arranged in inverted form directly adjacent to the feeder device 114 in FIG. 4, in which case, as FIG. 11 shows, it is not necessary to provide a double slanted separating wall 157. A single wall is entirely sufficient here.

Figure 12:
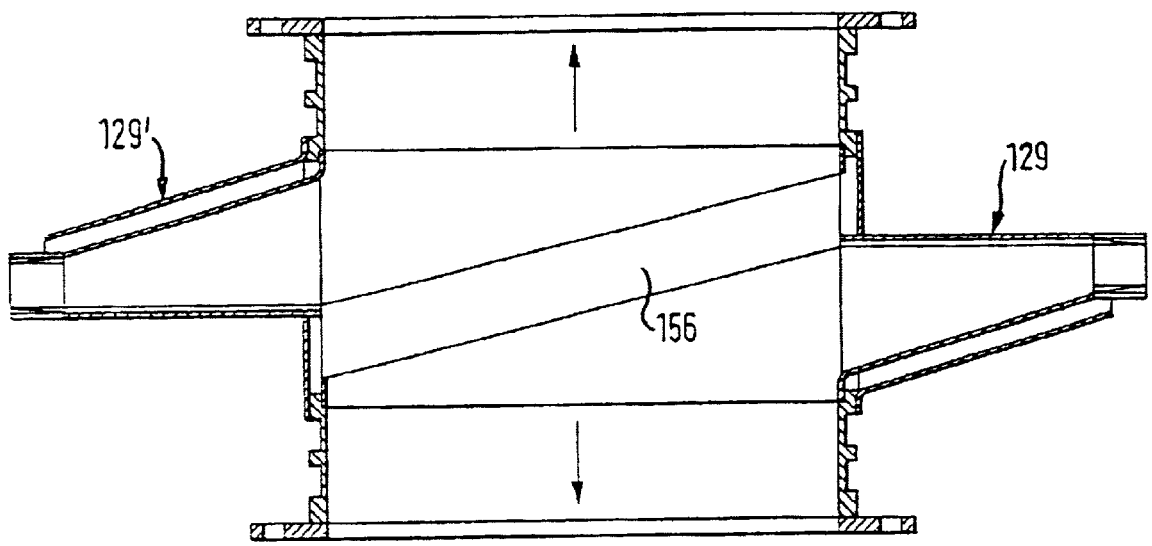
FIG. 12 is a representation similar to that in FIG. 10 but in which the heat generated by the burner arrangement is cycled into a reformer unit by radiation, said reformer unit receiving radiant heat from both sides.

As has been expressed above, the burner arrangement according to the invention serves primarily to supply radiant heat to the endothermic reaction positions of a fuel preparation system which naturally are to be arranged opposite the outlet surface 130 (FIG. 4) of the permeable body 120. How this can be achieved is shown in FIG. 12 in which two exhaust gas lines 129, 129' similar to the exhaust gas line 129 in FIG. 4 are arranged adjacent to each other with a reforming zone 156 arranged between them. Here the outer sides of the reforming zone 156, whose design is not shown in detail, themselves form the upper and the lower limits of the corresponding exhaust gas lines 129' so that the heat irradiated by the corresponding burners can be utilized directly in the reforming zone 156 without weakening.

Although the slanted walls of the feeder device 114, 114' of the gas lines 129, 129' shown here represent a preferred variant they are not absolutely necessary—the necessary deflecting and distributing functions can also be assured by other means.

What is claimed is:

1. A fuel processor comprising: (A) a reformation zone in which hydrogen/carbon-containing fuels are endothermically reformed into hydrogen; and (B) an integral burner adjacent said reformation zone providing radiant heat to said reformation zone, said burner comprising (i) an oxygen-catalyst-coated body permeable to a fuel-gas/oxygen mixture, and having a first face for admitting said fuel-gas/oxygen mixture into said body for catalytic burning therein, and a second heat-radiating face confronting and radiantly heating said reformation zone, (ii) a supply space confronting said first face and adapted to distribute said mixture substantially uniformly across said first face, (iii) an inlet to said supply space for supplying fuel gas and oxygen to said supply space, (iv) a combustion chamber interjacent said reformation zone and said second face for receiving exhaust gases exiting from said second face and flame-burning therein any unburned said mixture contained in said exhaust gases to supplement said radiant heat when an increasing demand for hydrogen exceeds the capability of said second face to radiantly heat said reformation zone quickly enough to satisfy said demand, (v) an outlet from said combustion chamber for discharging said exhaust gases from said combustion chamber, and (vi) an igniter in said combustion chamber to set said unburned mixture aflame therein when said demand exceeds said capability.

2. A fuel processor according to claim 1 including a gas-permeable member between said supply space and said inlet for admitting said mixture into said supply space while preventing the propagation of any flame formed in said supply space back into said inlet.

3. A fuel processor according to claim 1 wherein said outlet is located on a side of said combustion chamber so as to laterally discharge said exhaust gases from said combustion chamber.

4. A fuel processor according to claim 1 wherein said inlet is located on a side of said supply space so as to laterally supplying said mixture to said supply space.

5. A fuel processor according to claim 1 wherein said heat-radiating face is substantially rectangular and parallels said reformation zone.

6. A fuel processor according to claim 1 wherein said supply space is defined by a wall that lies opposite, and at an oblique angle to, said first face so as to form a tapering supply space having one end of said wall further from said first face than the other end of said wall, and said inlet supplies said fuel gas-oxygen mixture to said feed chamber from said one end.

7. A fuel processor according to claim 6 wherein said inlet is on a side of said supply space so as to laterally supply said mixture to said supply space.

8. A fuel processor according to claim 1 wherein said combustion chamber is defined by a wall that lies opposite, and at an oblique angle to, said second face so as to form a tapering combustion chamber having one end of said wall further from said second face that the other end of said wall, and said outlet discharges said exhaust gases from said combustion chamber from said one end.

9. A fuel processor according to claim 8 wherein said outlet is located on a side of said combustion chamber so as to laterally discharge said exhaust gases from said combustion chamber.

10. A fuel processor according to claim 8 wherein said wall defines said reformation zone.

11. A fuel processor comprising: (A) a reformation zone in which hydrogen/carbon-containing fuels are endothermically reformed into hydrogen, said reformation zone being defined by first and second opposing walls ; and (B) an integral radiant burner adjacent each of said opposing walls providing radiant heat to opposing sides of said reformation zone, each said burner comprising (i) an oxygen-catalyst-coated body permeable to a fuel-gas/oxygen, and having a first face for admitting said fuel gas/oxygen mixture into said body for catalytic burning therein, and a second heat-radiating face confronting one of said walls, (ii) a supply space confronting said first face and adapted to distribute said mixture substantially uniformly across said first face, (iii) an inlet to said supply space for supplying fuel gas and oxygen to said supply space, (iv) a combustion chamber interjacent a said reformation zone and said second face for receiving exhaust gases exiting from said second face, and for flame-burning therein any unburned said mixture contained in said exhaust gases to supplement said radiant heat when an increasing demand for hydrogen exceeds the capability of said second face to radiantly heat said reformation zone quickly enough to satisfy said demand using only said radiant heat, (v) an outlet from said combustion chamber for discharging said exhaust gases from said combustion chamber, and (vi) an igniter in said combustion chamber to set said unburned mixture aflame therein when said demand exceeds said capability.

12. A fuel processor according to claim 11 wherein said outlet is located on a side of said combustion chamber so as to laterally exhaust said exhaust gases from said combustion chamber.

13. A fuel processor according to claim 11 wherein said inlet is located on a side of each said supply space so as to laterally supply said mixture to said supply space.

14. A fuel processor comprising: (A) a reformation zone in which hydrogen/carbon-containing fuel is endothermically reformed into hydrogen; (B) a heating zone wherein said fuel is vaporized or superheated preparatory to reforming in said reformation zone; and (c) an integral burner adjacent each said reformation and heating zones to heat said reformation and heating zones, said burners each comprising (i) an oxidation-catalyst-coated body permeable to a fuel-gas/oxygen mixture and having a first face for admitting said mixture into said porous body and a second, heat-radiating face confronting a said reformation zone or heating zone for radiantly heating said zone, (ii) a supply space confronting said first face and adapted to distribute said mixture substantially uniformly across said first face, (iii) an inlet to said supply space for supplying said fuel and air to said supply space, (iv) a combustion chamber interjacent a said reformation or heating zone and said second face for receiving exhaust gases exiting from said second face and for flame-burning therein any unburned mixture contained in said exhaust gases to supplement said radiant heat when an increasing demand for hydrogen exceeds the capability of said second face to radiantly heat said reformation zone quickly enough to satisfy said demand using only said radiant heat, (v) an outlet from said combustion chamber for discharging said exhaust gases from said combustion chamber, and (vi) an igniter in said combustion chamber to set said unburned mixture aflame therein when said demand exceeds said capability.

15. A fuel processor according to claim 14 wherein a single supply space supplies said mixture to each said oxygen-catalyst-coated body.

16. A fuel processor according to claim 14 wherein each said combustion chamber is defined by a wall that lies opposite, and at an oblique angle to, a said second face, and said burners are arranged in said fuel processor such that said walls parallel each other and define a said reformation or heating zone therebetween.

17. A fuel processor according to claim 14 wherein each said supply space is defined by a wall that is common to, and shared by, another adjacent supply space, which wall lies opposite, and at an oblique angle to, a said first face.

18. A fuel processor comprising: (A) a reformation zone in which hydrogen/carbon-containing fuel is endothermically reformed into hydrogen; (B) a heating zone wherein said fuel is vaporized or superheated prepatory to reforming; and (C) an integral burner adjacent each said reformation and heating ones to heat said reformation and heating zones, said burners each comprising (i) an oxidation-catalyst-coated body permeable to a fuel-gas/oxygen mixture and having a first face for admitting said mixture into said body and a second, heat-radiating face confronting a said reformation zone or heating zone for radiantly heating said zone, (ii) a supply space confronting said first face and adapted to distribute said mixture substantially uniformly across said first face, (iii) an inlet to said supply space for supplying said fuel and air to said supply space, (iv) a combustion chamber interjacent a said reformation or heating zone and said second face for receiving exhaust gases exiting from said second face and for flame-burning therein any unburned mixture contained in said exhaust gases to supplement the radiant heat provided by said catalyst-mated body when an increasing demand for hydrogen exceeds the capability of said second face to radiantly heat said reformation zone quickly enough to satisfy said demand, (v) an outlet from said combustion chamber for discharging said exhaust gases from said combustion chamber, and (vi) an igniter in said combustion chamber to set said unburned mixture aflame therein when said demand exceeds said capability.

19. A method of operating a fuel processor during periods of increasing hydrogen demands, said fuel processor including (A) a reformation zone for the endothermic reformation of hydrogen/carbon-containing fuels to produce hydrogen, and (B) an integral radiant burner having (i) a gas-permeable, oxygen-catalyst-coated body for catalytically burning a fuel-gas/oxygen mixture therein, said body having a first face for admitting said fuel-gas/oxygen mixture into said body, and a second heat-radiating face confronting, and radiantly heating, said reformation zone, and (ii) a combustion chamber interjacent said reformation zone and said second face for receiving exhaust gases exiting from said second face, comprising the steps of:

(1) supplying said mixture to said first face at a first flow rate that permits substantially all of said mixture to be catalytically burned within said body to radiantly heat said reformation zone enough for said zone to produce hydrogen at a first hydrogen-production rate sufficient to satisfy a first hydrogen demand;

(2) increasing the hydrogen production rate to a second hydrogen production rate that is greater than said first hydrogen production rate to satisfy increasing hydrogen demands;

(3) supplying said mixture to said first face at an increasing flow rate that is commensurate with said increasing hydrogen production rate, said increasing flow rate being such that some unburned mixture exits said second face in said exhaust gases as said hydrogen production rate transitions between said first and second hydrogen production rates; and (3) setting said unburned mixture aflame in said combustion chamber to supplement the radiant heat provided by said body when said mixture is being supplied to said first face at said increasing flow rate.

* * * * *